United States Patent
Boss et al.

(10) Patent No.: US 8,744,679 B2
(45) Date of Patent: *Jun. 3, 2014

(54) TIRE PRESSURE ADJUSTMENT

(71) Applicant: International Business Machines Corporation, Armonk, NY (US)

(72) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/930,205

(22) Filed: Jun. 28, 2013

(65) Prior Publication Data

US 2013/0289823 A1 Oct. 31, 2013

Related U.S. Application Data

(63) Continuation of application No. 13/350,089, filed on Jan. 13, 2012, now Pat. No. 8,532,872.

(51) Int. Cl.
*G06F 7/00* (2006.01)

(52) U.S. Cl.
USPC ............................. 701/36; 340/442; 152/415

(58) Field of Classification Search
USPC ...................... 701/36; 340/442; 152/415, 418
See application file for complete search history.

(56) References Cited

U.S. PATENT DOCUMENTS

| 5,327,346 A | 7/1994 | Goodell |
| 5,452,753 A | 9/1995 | Olney |
| 5,587,698 A | 12/1996 | Genna |
| 6,144,295 A | 11/2000 | Adams et al. |
| 7,530,379 B1 | 5/2009 | Becker et al. |

(Continued)

FOREIGN PATENT DOCUMENTS

JP 03-005211 1/1991

OTHER PUBLICATIONS

TIREMAAX, Automatic Tire Inflation systems, Hendrickson, Oct. 10, 2011, retrieved from Internet: www.hendrickson-intl.com/pdfs/trailer_PDFs/L1017, 4 pages.

Groenewald et al., In-Motion Tyre Pressure Control System for Vehicles,0-7803-31-09-5/96, pp. 1465-1468.

(Continued)

*Primary Examiner* — Mary Cheung
*Assistant Examiner* — Brian P Sweeney
(74) *Attorney, Agent, or Firm* — Schmeiser, Olsen & Watts; Matthew Chung (57) ABSTRACT

A tire pressure adjustment method and system is provided. The method includes receiving from a plurality of sensors in a vehicle, tread depth data associated with tread depths at multiple points on a tire tread comprised by a tire on the vehicle. The tread depth data is analyzed. A tire pressure value for an internal portion of the tire is determined based on results of the analysis. The tire pressure value is associated with modifying a group of tread depths during operation of the vehicle. In response, a command signal is generated. The command signal is configured to command a tire pressure modification device to adjust a current tire pressure value of the internal portion of the tire to the determined tire pressure value. The command signal is transmitted to the tire pressure modification device resulting in the current tire pressure value being adjusted to determined tire pressure value.

19 Claims, 6 Drawing Sheets

(56) References Cited

U.S. PATENT DOCUMENTS

| | | | |
|---|---|---|---|
| 7,762,129 B2 | 7/2010 | Niklas et al. | |
| 8,009,027 B2 | 8/2011 | Thomas et al. | |
| 8,532,872 B2* | 9/2013 | Boss et al. | 701/36 |
| 2005/0102073 A1* | 5/2005 | Ingram, II | 701/29 |
| 2008/0060732 A1 | 3/2008 | Rumbaugh | |
| 2009/0210111 A1 | 8/2009 | Laermer et al. | |
| 2011/0175716 A1 | 7/2011 | Medley et al. | |

OTHER PUBLICATIONS

Lee Ann Obringer, How Self-inflating Tires Work, Oct. 7, 2011, retrieved from Internet: http://auto.howstuffworks.com/self-inflating-tire2.htm, 4 pages.

CleanMPG.com, Bridgestone Develops New Multi Air Chamber Tire, retrieved from Internet: http://www.bridgestone-firestone.com/news/news_index.asp?id=2006/060228a, Oct. 7, 2011, 1 page.

Hendrickson, TIREMAAX PRO, retrieved from Internet: http://www.hendrickson-intl.com/motorhead/default.asp, 2 pages, Oct. 7, 2011.

Office Action (Mail Date Dec. 28, 2012) for U.S. Appl. No. 13/350,089, filed Jan. 13, 2012; Confirmation No. 1469.

Amendment filed Mar. 14, 2013 in response to Office Action (Mail Date Dec. 28, 2012) for U.S. Appl. No. 13/350,089, filed Jan. 13, 2012; Confirmation No. 1469.

Notice of Allowance (Mail Date May 2, 2013) for U.S. Appl. No. 13/350,089, filed Jan. 13, 2012; Confirmation No. 1469.

* cited by examiner

TIRE PRESSURE ADJUSTMENT

This application is a continuation application claiming priority to Ser. No. 13/350,089 filed Jan. 13, 2012, now U.S. Pat. No. 8,532,872, issued Sep. 10, 2013.

FIELD

The present invention relates to a method and associated system for adjusting tire pressure based on tire attributes.

BACKGROUND

Modifying an apparatus based on a functionality of the apparatus typically comprises an inaccurate process with little flexibility. Determining the functionality of the apparatus may include a complicated process that may be time consuming and require a large amount of resources. Accordingly, there exists a need in the art to overcome at least some of the deficiencies and limitations described herein above.

SUMMARY

The present invention provides a method comprising: receiving, by a computer processor of a computing system from a first plurality of sensors in a vehicle, first tread depth data associated with first tread depths at multiple points on a first tire tread comprised by a first tire on the vehicle; first analyzing, by the computer processor, the first tread depth data; determining, by the computer processor based on results of the first analyzing, a first tire pressure value for a first internal portion of the first tire, wherein the first tire pressure value is associated with modifying a first group of tread depths of the first tread depths during operation of the vehicle; generating, by the computer processor, a first command signal configured to command a first tire pressure modification device to adjust a tire pressure value of the first internal portion of the first tire to the first tire pressure value, wherein the tire pressure value comprises a current tire pressure value; and transmitting, by the computer processor, the first command signal to the first tire pressure modification device resulting in the tire pressure value being adjusted to the first tire pressure value.

The present invention provides a computer program product, comprising a computer readable storage device storing a computer readable program code, the computer readable program code comprising an algorithm that when executed by a computer processor of a computer system implements a method, the method comprising: receiving, by the computer processor from a first plurality of sensors in a vehicle, first tread depth data associated with first tread depths at multiple points on a first tire tread comprised by a first tire on the vehicle; first analyzing, by the computer processor, the first tread depth data; determining, by the computer processor based on results of the first analyzing, a first tire pressure value for a first internal portion of the first tire, wherein the first tire pressure value is associated with modifying a first group of tread depths of the first tread depths during operation of the vehicle; generating, by the computer processor, a first command signal configured to command a first tire pressure modification device to adjust a tire pressure value of the first internal portion of the first tire to the first tire pressure value, wherein the tire pressure value comprises a current tire pressure value; and transmitting, by the computer processor, the first command signal to the first tire pressure modification device resulting in the tire pressure value being adjusted to the first tire pressure value.

The present invention provides a computer system comprising a computer processor coupled to a computer-readable memory unit, the memory unit comprising instructions that when executed by the computer processor implements a method comprising: receiving, receiving, by the computer processor from a first plurality of sensors in a vehicle, first tread depth data associated with first tread depths at multiple points on a first tire tread comprised by a first tire on the vehicle; first analyzing, by the computer processor, the first tread depth data; determining, by the computer processor based on results of the first analyzing, a first tire pressure value for a first internal portion of the first tire, wherein the first tire pressure value is associated with modifying a first group of tread depths of the first tread depths during operation of the vehicle; generating, by the computer processor, a first command signal configured to command a first tire pressure modification device to adjust a tire pressure value of the first internal portion of the first tire to the first tire pressure value, wherein the tire pressure value comprises a current tire pressure value; and transmitting, by the computer processor, the first command signal to the first tire pressure modification device resulting in the tire pressure value being adjusted to the first tire pressure value.

The present invention advantageously provides a simple method and associated system capable of modifying an apparatus.

DETAILED DESCRIPTION

Figure 1:
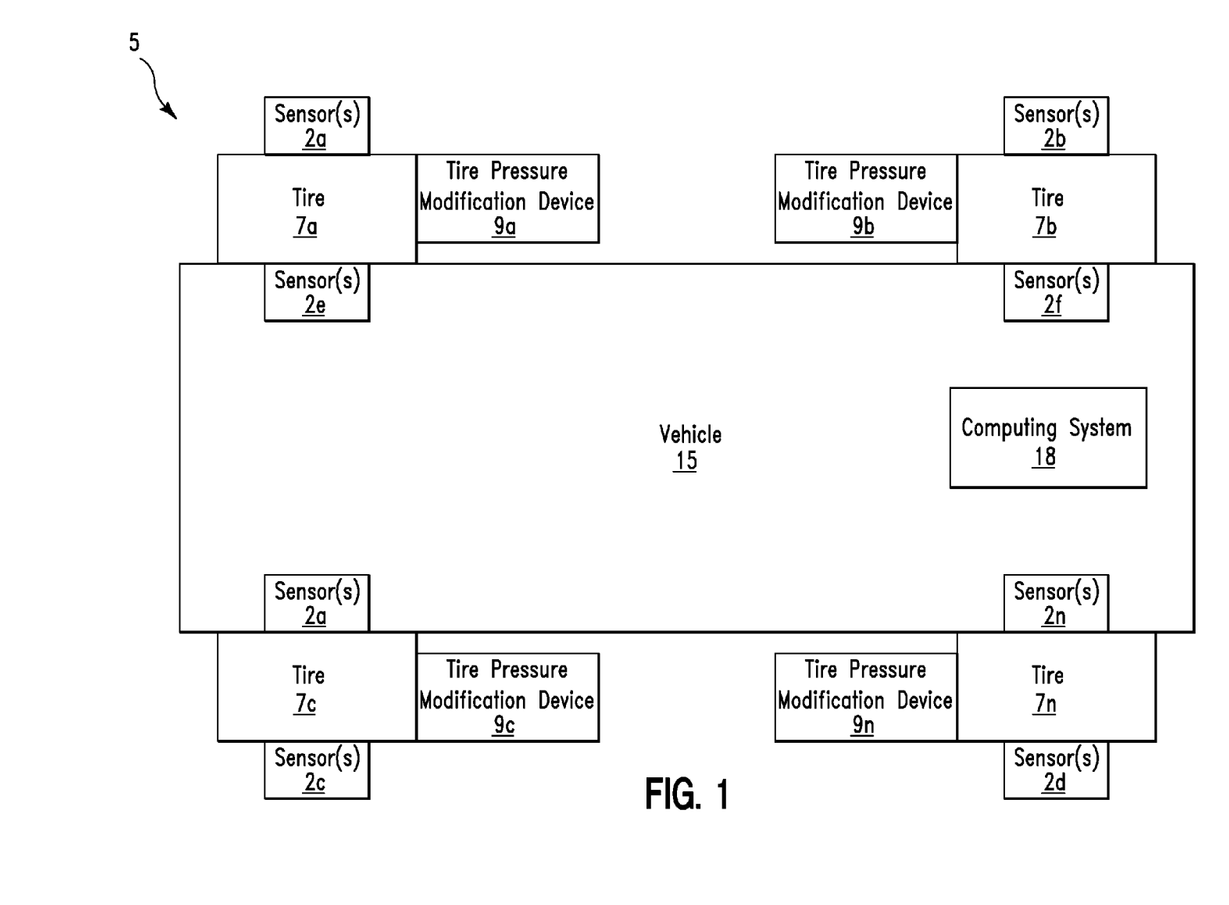
FIG. 1 illustrates a system for automatically/dynamically adjusting a tire pressure(s) based on tread wear patterns and/or road conditions, in accordance with embodiments of the present invention.
Figure 4:
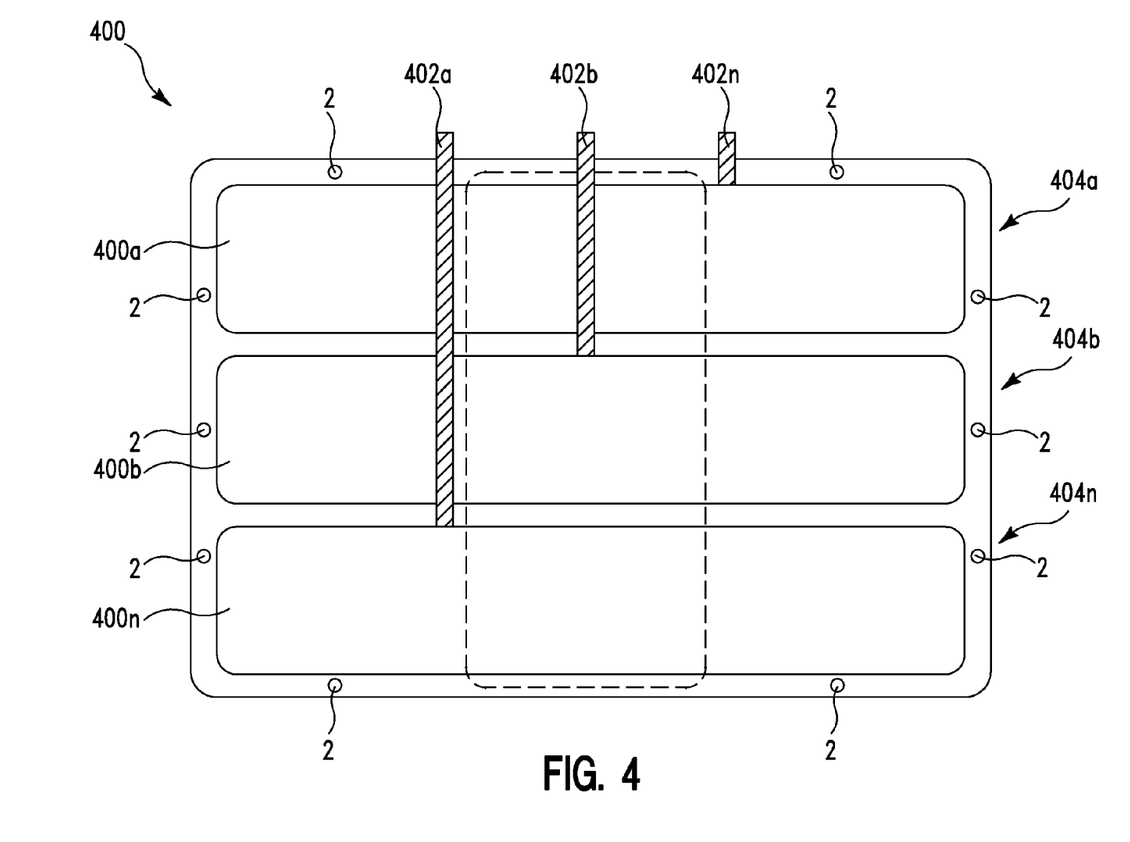
FIG. 4 illustrates a cross sectional view of a tire comprising multiple independent air pressure chambers, in accordance with embodiments of the present invention.

FIG. 1 illustrates a system 1 for automatically/dynamically adjusting a tire pressure(s) based on tread wear patterns and/or road conditions, in accordance with embodiments of the present invention. System 1 comprises sensors 2a . . . 2n installed at multiple locations on tires 7a . . . 7n and/or on any location on a vehicle 15 (e.g., a wheel well, a bumper, fenders, doors, windows, a body component of vehicle 15, any combination therein, etc) comprising tires 7a . . . 7n. Vehicle 15 may comprise any type of vehicle including, inter alia, an automobile, a truck, an aircraft with tires, a motorcycle, etc. Tires 7a . . . 7n may comprise any type of tire including, inter alia, a single chamber tire comprising a single inflation chamber, a multi-chamber tire comprising multiple distinct chambers of inflation (as illustrated in FIG. 4). System 1 additionally comprises tire pressure modification devices 9a . . . 9n and a computing system 18. Computing system 18 may be located within (i.e., as illustrated in FIG. 1) or remote with respect to vehicle 15. Sensors 2a . . . 2n and tire pressure modification devices 9a . . . 9n may be located internal and/or external to tires 7a . . . 7n and/or vehicle 15. Sensors 2a . . . 2n that are located internal to tires 7a . . . 7n may be located at any position within or on tires 7a . . . 7n. For example, sensors 2a . . . 2n that are located internal to tires 7a . . . 7n may be located within a tread of tires 7a . . . 7n, between the tread of tires 7a . . . 7n, within a sidewall of tires 7a . . . 7n, etc. Sensors 2a . . . 2n are used to monitor: a tire tread on tire(s) 7a . . . 7n, wear patterns on tire(s) 7a . . . 7n, and/or a tire pressure of tire(s) 7a . . . 7n. System 1 retrieves data from sensors 2a . . . 2n to dynamically inflate or deflate (i.e., using tire pressure modification devices 9a . . . 9n) tires 7a . . . 7n to increase traction and/or improve tire tread wear. Sensors 2a . . . 2n may comprise any type of sensors including, inter alia, optical sensors, laser sensors, seismic sensors, magnetic sensors, RFID sensors, etc. Tire pressure modification devices 9a . . . 9n may comprise any type of pressure modification device including, inter alia, an air compressor, an air pressure reduction device, etc. Sensors 2a . . . 2n and tire pressure modification devices 9a . . . 9n are electrically coupled to computing system 18. Sensors 2a . . . 2n and tire pressure modification devices 9a . . . 9n may be electrically coupled to the computing device 18 using a physical link (i.e., conductive wire, fiber optic cable, etc) or a wireless link such as, inter alia, an RF signal. Data signals comprise: data regarding tread depths for tires 7a . . . 7n, environmental conditions (e.g., weather conditions, road conditions, a temperature, etc), etc. Computing system 18 is adapted to process data from the data signals. Processing the data may comprise performing tread depth calculations, calculating car load values, etc. The processed data may be transmitted to an output device (e.g., a monitor for user viewing) as well as tire pressure modification devices 9a . . . 9n (as a control signal to adjust tire pressures).

Computing system 18 may comprise any type of computing system(s) including, inter alia, a computer (PC), a laptop computer, a server, a PDA, a smart phone, etc. Computing system 18 may comprise a memory system for data storage. The memory system may comprise a single memory system. Alternatively, the memory system may comprise a plurality of memory systems.

System 1 enables a process for adjusting a tire pressure(s) (of tires 7a . . . 7n) to compensate for various tread wear patterns and/or road conditions. System 1 detects uneven wear patterns as well as a loss of traction and implements automatic and/or manual tire inflation or deflation actions to compensate. System 1 enables a process to assist with providing extended tire life in real world conditions. Sensors 2a . . . 2n installed in multiple locations within tires 7a . . . 7n and/or vehicle 15 are used to measure and monitor tire tread depth, wear patterns of the tire tread, and tire pressure across an entire latitudinal profile of tires 7a . . . 7n. The tire tread wear patterns are detected across multiple points on tires 7a . . . 7n. The tire tread wear patterns are analyzed and resulting data is used to enable a method for dynamically inflating or deflating tires 7a . . . 7n in order to improve tire tread wear and or increase tire traction. System 1 additionally enables a manual over-ride for declining any tire inflation pressure value changes. Sensors 2a . . . 2n retrieve data enabling computing system 18 to determine tire wear on an inside, outside, or middle portion of any of tires 7a . . . 7n and in response may command tire pressure modification devices 9a . . . 9n to inflate or deflate tires 7a . . . 7n thereby allowing tires 7a . . . 7n to alter or change a tread wear pattern. The aforementioned process may extend a life of tires 7a . . . 7n by evening out wear patterns of the tires 7a . . . 7n and notifying a user of any maintenance (e.g., a front-end alignment, a camber or toe repair, etc) that should be performed to discontinue the premature tire wear pattern. Sensors 2a . . . 2n may be placed at any location on or within tires 7a . . . 7n and/or vehicle 15. For example, sensors 2a . . . 2n may be inserted into a rubber portion of an associated tire in order to measure a thickness of the rubber by, inter alia, a metal lead, ultrasonic measurement, etc. Additionally, sensors 2a . . . 2n may be deployed to measure tread depth by embedding sensors 2a . . . 2n in a rubber portion of a tire at a specified depth while using a laser (e.g., within a fender of vehicle 15) to measure a distance or time for a signal to return to the laser upon bouncing off of a sensor. Additionally, one or more lasers may be placed within a wheel well (of vehicle 15) and a difference between tread depths of a tread pattern may be calculated. As an alternative, one or more sensors may be placed on an axle (of vehicle 15) and a distance from the pavement/road may be measured thereby determining an average tire tread wear.

The following implementation examples describe usage processes enabled by system 1 for automatically/dynamically adjusting tire pressures based on tread wear patterns and/or road conditions:

EXAMPLE 1

A user's vehicle is showing tire tread wear patterns on an outside edge of two rear tires (on a vehicle) due to the tires being under inflated. A recommended tire inflation pressure value for the vehicle comprises 36 pounds per square inch (psi) but the two rear tires comprise a current tire inflation pressure value of 18 psi (i.e., under inflated). System 1 recognizes the uneven outside edge tire tread wear pattern and displays a message on the user's console that the rear two tires should be inflated to 39 psi (i.e., over inflated) for the next 500 miles. The slight over inflation value (over the recommended 36 psi value) comprises a safe over inflation value and will cause the two rear tires to begin wearing a tire tread in a center of the rear tires. After the user has commanded tire pressure modification devices (within the rear tires) to inflate the rear tires to 39 psi and the vehicle has been driven 500 miles, sensors within the rear tires detect an even wear pattern and a second message is transmitted to the user's console to command the user to deflate the two rear tires to the recommended 36 psi tire inflation pressure value.

EXAMPLE 2

A user's vehicle is showing slight tire tread wear patterns on an outside edge of all four tires due to excessive hard cornering. The vehicle comprises an advanced tire inflation system that has kept the four tires at a constant 36 psi tire inflation pressure value. System 1 recognizes the slight tire tread wear patterns and automatically adjusts the tire inflation pressure values of all four tires to 37 psi. Every 20 miles additional tire inflation pressure value measurements are retrieved and evaluated to ensure the tire tread wear patterns are returning to an even pattern. Constant adjustments may be enabled throughout a life-cycle of the tires to ensure maintenance of an even tire tread wear pattern.

EXAMPLE 3

A user driving in a 4 wheel drive vehicle during a winter storm witnesses a stranded vehicle stuck in a snow bank off to the side of a road. The user pulls over and offers to help pull the stranded vehicle free. After attaching a tow rope to the stranded vehicle, he/she finds that the 4 wheel drive vehicle doesn't have enough traction on the ice covered road to free the entrenched vehicle. In response, system 1 automatically deflates each of the 4 tires (belonging to the 4 wheel drive vehicle) to a tire inflation pressure value of 16 psi in order to generate more surface area (on each of the tires) to contact the road. The aforementioned reduction in psi generates enough traction to pull the stranded vehicle free and a few minutes later the 4 tires (of the 4 wheel drive vehicle) are automatically returned to a recommended tire inflation pressure value 36 psi as the slipping condition is no longer present.

EXAMPLE 4

A user in a 4 wheel drive vehicle begins driving on a sandy beach and system 1 automatically detects the soft sand and deflates each of the 4 tires (belonging to the 4 wheel drive vehicle) to a lower tire inflation pressure value to achieve a maximum traction. When the user exits the sandy beach, a paved road is detected and system 1 automatically inflates the 4 tires (belonging to the 4 wheel drive vehicle) to a higher recommended tire inflation pressure value.

Figure 2:
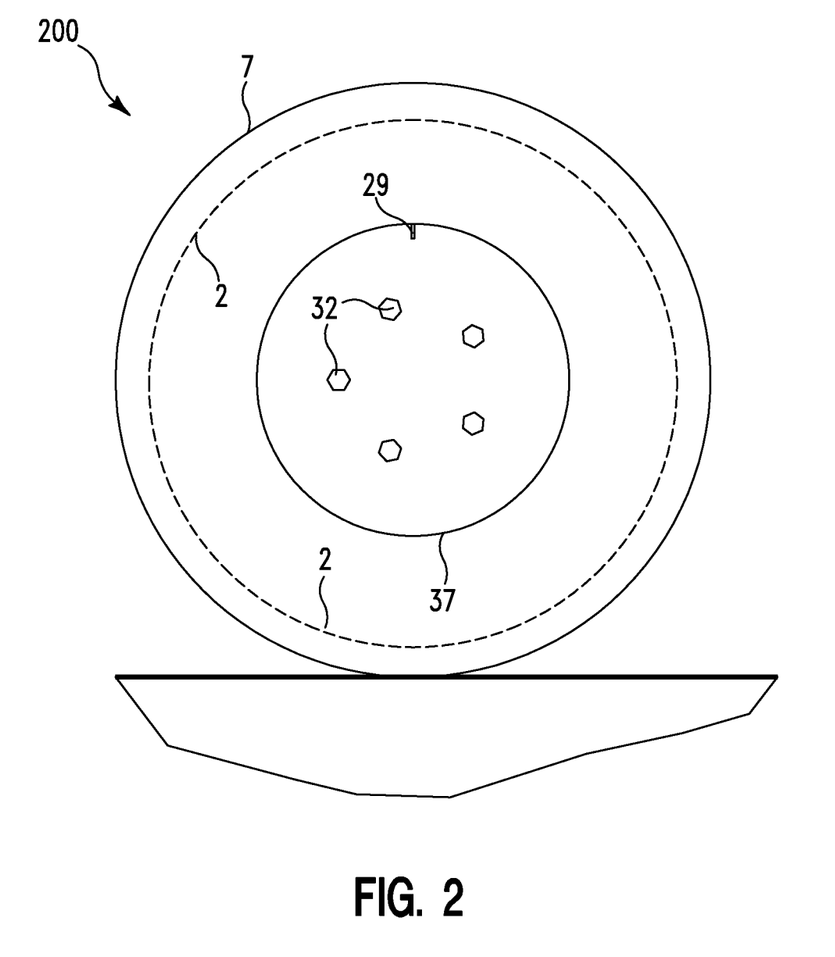
FIG. 2 illustrates a first cross sectional view of a tire assembly, in accordance with embodiments of the present invention.

FIG. 2 illustrates a cross sectional view of a tire assembly 200, in accordance with embodiments of the present invention. Tire assembly 200 comprises a tire 7 mounted on a wheel 37. Wheel 37 comprises a valve stem (for inflating the tire) and is mounted to a vehicle (e.g., vehicle 15 of FIG. 1) using lug nuts 32. Tire 7 comprises a plurality of sensors 2 (e.g., for measuring a tire tread depth) for enabling a process for automatically/dynamically adjusting tire pressures based on tread wear patterns and/or road conditions as described with respect to FIG. 1, supra.

Figure 3:
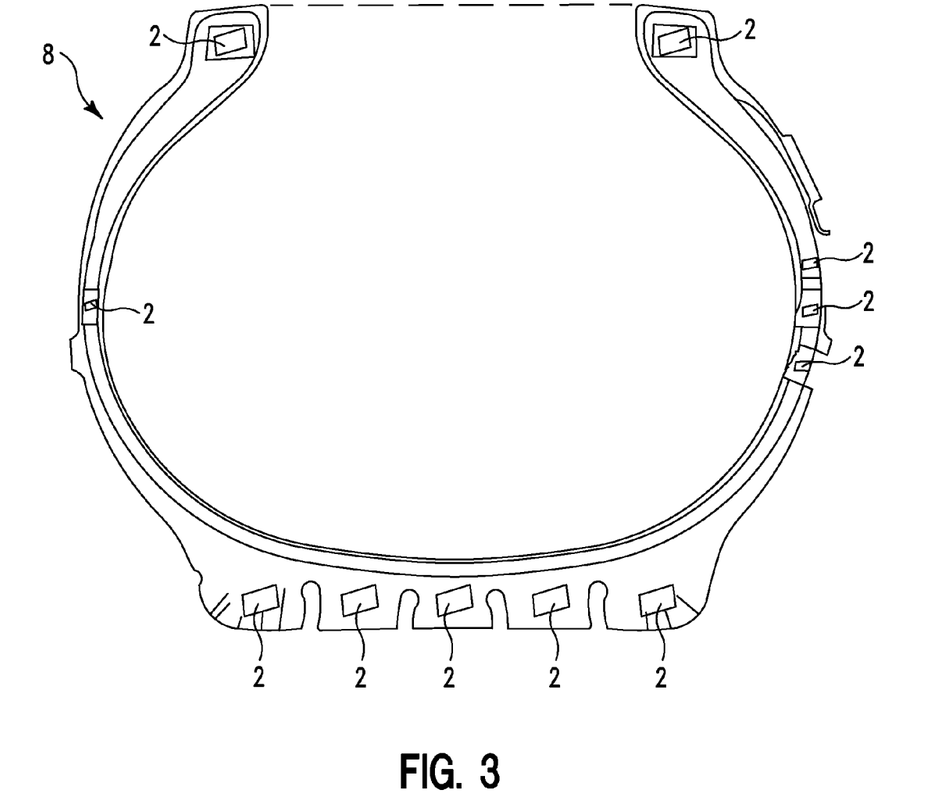
FIG. 3 illustrates a second cross sectional view of a tire assembly, in accordance with embodiments of the present invention.

FIG. 3 illustrates a cross sectional view of a tire 8, in accordance with embodiments of the present invention. Tire 8 comprises a plurality of sensors 2 in multiple locations on tire 8 for enabling a process for automatically/dynamically adjusting tire pressures based on tread wear patterns and/or road conditions as described with respect to FIG. 1, supra.

FIG. 4 illustrates a cross sectional view of a tire 400 comprising multiple independent air pressure chambers 400a . . . 400n, in accordance with embodiments of the present invention. The multiple independent air pressure chambers 400a . . . 400n allow different portions of the tire 400 to be inflated independently depending on a tire tread wear pattern and/or road conditions. Tire 400 comprises sensors 2 placed strategically to measure tire metrics at an outer portion 404a, a middle portion 404b, and an inner portion 404n of tire 400. Tire 400 allows for adjusting only a portion of tire 400 requiring a change for a tire inflation pressure value due to, inter alia, a lack of or excess of tire pressure, increased wear on a specified portion of tire 400 due to a mechanical/operational problem, a change in road conditions, etc.

Figure 5:
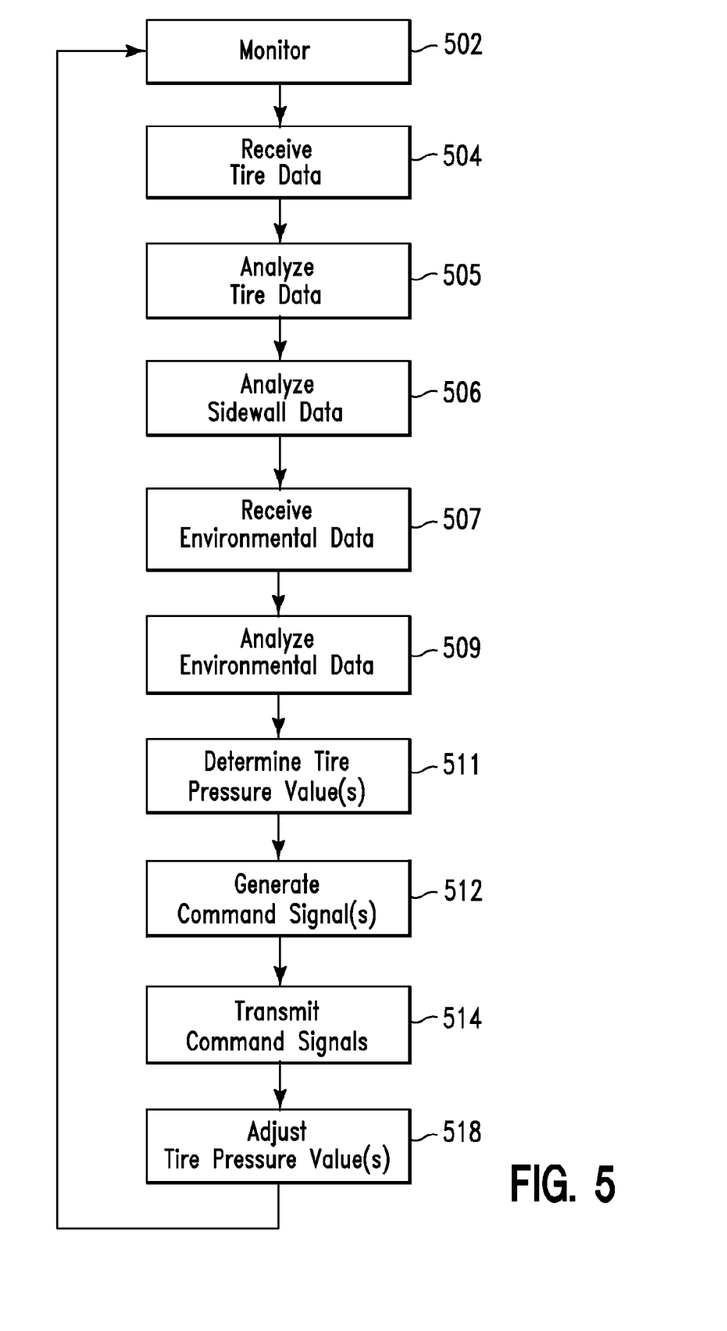
FIG. 5 illustrates an algorithm detailing a process flow for automatically/dynamically adjusting a tire pressure(s) based on tread wear patterns and/or road conditions, in accordance with embodiments of the present invention.

FIG. 5 illustrates an algorithm detailing a process flow enabled by system 1 of FIG. 1 for automatically/dynamically adjusting a tire pressure(s) based on tread wear patterns and/or road conditions, in accordance with embodiments of the present invention. In step 502, sensors (e.g., sensors 2a . . . 2n of FIG. 1) monitor attributes associated with tires on a vehicle (e.g., tires 7a . . . 7n on vehicle 15 in FIG. 1) and environmental conditions associated with the vehicle. The attributes associated with the tires may include, inter alia, tread depths/conditions of treads of the tires, sidewall conditions of the tires, etc. The environmental conditions may include, inter alia, a temperature, road conditions, weather conditions, etc. In step 504, a computing system (e.g., computing system 18 of FIG. 1) receives (from the sensors) tire data describing the attributes associated with the tires. For example the tire data may include data associated with multiple tire tread depths at multiple points on a single tire or multiple tires. In step 505, the tire data is analyzed. In step 506, received sidewall data is analyzed. In (optional) step 507, the computing system receives (from the sensors) environmental data describing environmental conditions associated with the vehicle. In step 509, the environmental data is analyzed. In step 511, (temporary) tire pressure values (for different internal portions of different tires) are determined based on results of the analysis of steps 505, 506, and 509. The tire pressure values are associated with modifying (and/or correcting) different groups of tread depths of the different tires during operation of the vehicle. The tire pressure values may additionally be associated with providing increased tire fraction during different environmental conditions. In step 512, command signals are generated for commanding tire pressure modification devices to adjust the tire pressure values. In step 514, the command signals are transmitted to the tire pressure modification devices. In step 518 (in response to the command signals), the tire pressure modification devices modify (e.g., increase tire pressure, decrease tire pressure, etc) the tire pressures of the tires to the determined tire pressure values.

Figure 6:
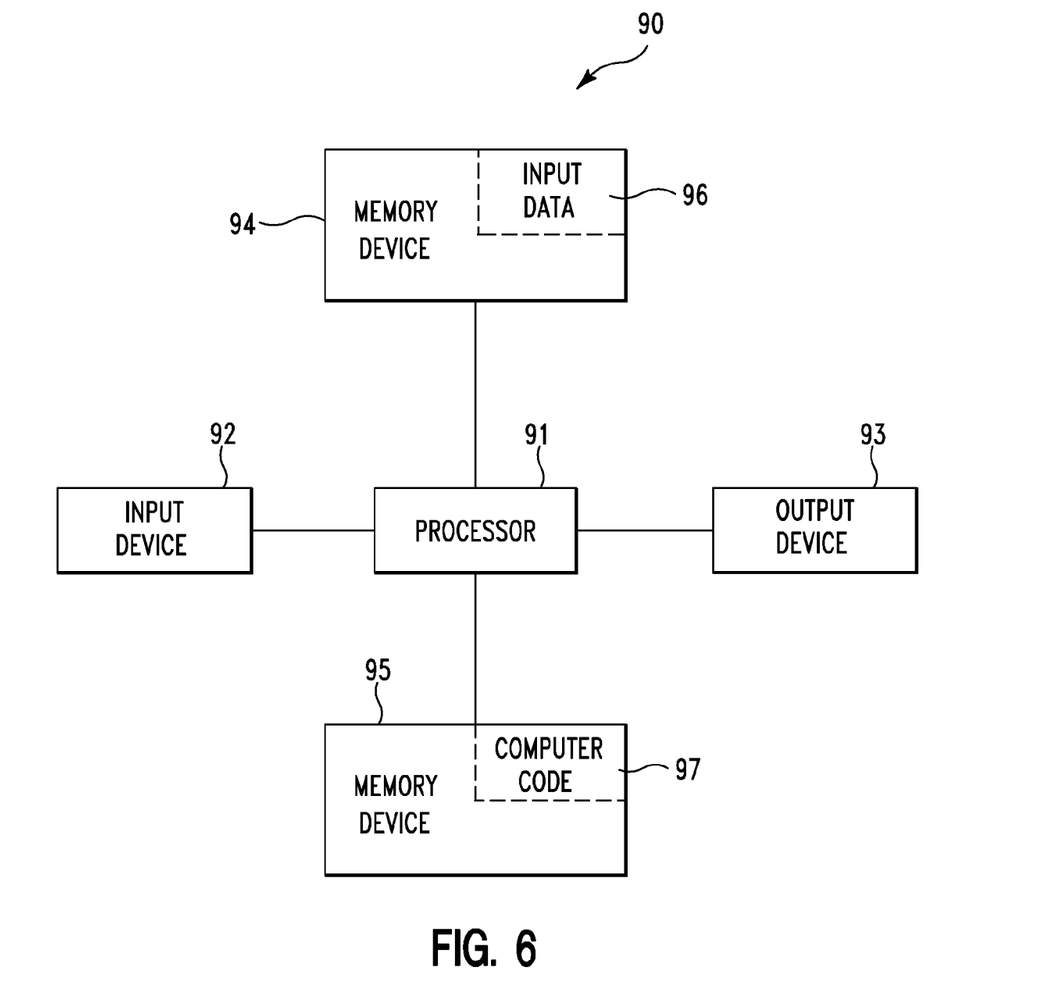
FIG. 6 illustrates a computer apparatus used for automatically/dynamically adjusting a tire pressure(s) based on tread wear patterns and/or road conditions, in accordance with embodiments of the present invention.

FIG. 6 illustrates a computer apparatus 90 used by system 2 of FIG. 1 for automatically/dynamically adjusting a tire pressure(s) based on tread wear patterns and/or road conditions, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 5) for automatically/dynamically adjusting a tire pressure(s) based on tread wear patterns and/or road conditions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithm of FIG. 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to automatically/dynamically adjust a tire pressure(s) based on tread wear patterns and/or road conditions. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for automatically/dynamically adjusting a tire pressure(s) based on tread wear patterns and/or road conditions. In another embodiment, the invention provides a business method that performs the process steps of the invention on a subscription, advertising, and/or fee basis. That is, a service supplier, such as a Solution Integrator, could offer to automatically/dynamically adjust a tire pressure(s) based on tread wear patterns and/or road conditions. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving, by a computer processor of a computing system from a first plurality of sensors in a vehicle, first tread depth data associated with first tread depths at multiple points on a first tire tread comprised by a first tire on said vehicle;
first analyzing, by said computer processor, said first tread depth data;
determining, by said computer processor based on results of said first analyzing, uneven tread wear patterns at said multiple points of said first tire tread;
receiving, by said computer processor from a second plurality of sensors in said vehicle, sidewall data associated with sidewall portions of sidewalls on said first tire;
second analyzing, by said computer processor, said sidewall data; and
determining, by said computer processor based on results of said first analyzing, said second analyzing, and said uneven tread wear patterns, a first tire pressure value for a first internal portion of said first tire, wherein said first tire pressure value comprises a temporary tire pressure value associated with modifying a first group of tread depths of said first tread depths during operation of said vehicle, and wherein said modifying said first group of tread depths corrects said uneven tread wear patterns.

2. The method of claim 1, further comprising:
generating a first command signal comprising a command for inflating said first portion of said first tire to said first tire pressure value.

3. The method of claim 1, further comprising:
generating a first command signal comprising a command for deflating said first portion of said first tire to said first tire pressure value.

4. The method of claim 1, further comprising:
determining, by said computer processor based on results of said first analyzing, a second tire pressure value for a second internal portion of said tire, wherein said first tire pressure value differs from said second tire pressure value, wherein said internal portion differs from said second internal portion, wherein said second tire pressure value is associated with modifying a second group of tread depths of said first tread depths during operation of said vehicle, and wherein said second group of tread depths differ from said second group of tread depths;
generating, by said computer processor, a second command signal configured to command a second tire pressure modification device to adjust a second current tire pressure value of said second internal portion of said first tire to said second tire pressure value; and
transmitting, by said computer processor, said first command signal to said second tire pressure modification device resulting in said second current tire pressure value being adjusted to said second tire pressure value.

5. The method of claim 1, further comprising:
receiving, by said computer processor from a second plurality of sensors in said vehicle, second tread depth data associated with second tread depths at multiple points on a second tire tread comprised by a second tire on said vehicle;
second analyzing, by said computer processor, said second tread depth data;
determining, by said computer processor based on results of said second analyzing, a second tire pressure value for a second internal portion of said second tire, wherein said second tire pressure value is associated with modifying a second group of tread depths of said second tread depths during operation of said vehicle;
generating, by said computer processor, a second command signal configured to command a second tire pressure modification device to adjust a second current tire pressure value of said second internal portion of said second tire to said second tire pressure value; and
transmitting, by said computer processor, said second command signal to said second tire pressure modification device resulting in said second current tire pressure value being adjusted to said second tire pressure value.

6. The method of claim 5, wherein said second tire pressure value differs from said first tire pressure value.

7. The method of claim 1, further comprising:
receiving, by said computer processor from a second plurality of sensors in said vehicle, environmental data comprising environmental conditions associated with said vehicle; and
second analyzing, by said computer processor, said environmental data, wherein said determining said first tire pressure value is further based on results of said second analyzing.

8. The method of claim 7, further comprising:
receiving, by said computer processor from said second plurality of sensors in said vehicle, data indicating that said environmental conditions comprise normal driving conditions for said vehicle;
third analyzing, by said computer processor, said data;
generating, by said computer processor, a second command signal configured to command said first tire pressure modification device to adjust said first tire pressure value of said first internal portion of said first tire back to said tire pressure value; and
transmitting, by said computer processor, said second command signal to said first tire pressure modification device resulting in said first tire pressure value being adjusted to said tire pressure value.

9. The method of claim 7, wherein said environmental conditions are selected from the group consisting of a temperature, road conditions, and weather conditions.

10. The method of claim 1, wherein said second plurality of sensors are located within said first tire.

11. The method of claim 1, wherein said second plurality of sensors are located in portions of said vehicle external to said first tire.

12. The method of claim 1, wherein said first plurality of sensors are located within said first tire.

13. The method of claim 1, wherein said first plurality of sensors are located in portions of said vehicle external to said first tire.

14. The method of claim 1, wherein said first plurality of sensors are located in said first tire and portions of said vehicle external to said first tire.

15. The method of claim 1, said first internal portion of said first tire comprises an entire portion of said first tire.

16. The method of claim 1, further comprising:
receiving, by said computer processor from a second plurality of sensors in said vehicle, load data comprising load conditions associated with said vehicle; and
second analyzing, by said computer processor, said load data, wherein said determining said first tire pressure value is further based on results of said second analyzing.

17. The method of claim 1, further comprising:
providing at least one support service for at least one of creating, integrating, hosting, maintaining, and deploying computer-readable code in said computing system, wherein the code in combination with the computing system is capable of performing the method of claim 1.

18. A computer program product, comprising a computer readable storage device storing a computer readable program code, said computer readable program code comprising an algorithm that when executed by a computer processor of a computer system implements a method, said method comprising:
receiving, by said computer processor from a first plurality of sensors in a vehicle, first tread depth data associated with first tread depths at multiple points on a first tire tread comprised by a first tire on said vehicle;
first analyzing, by said computer processor, said first tread depth data;
determining, by said computer processor based on results of said first analyzing, uneven tread wear patterns at said multiple points of said first tire tread;
receiving, by said computer processor from a second plurality of sensors in said vehicle, sidewall data associated with sidewall portions of sidewalls on said first tire;
second analyzing, by said computer processor, said sidewall data; and
determining, by said computer processor based on results of said first analyzing, said second analyzing, and said uneven tread wear patterns, a first tire pressure value for a first internal portion of said first tire, wherein said first tire pressure value comprises a temporary tire pressure value associated with modifying a first group of tread depths of said first tread depths during operation of said vehicle, and wherein said modifying said first group of tread depths corrects said uneven tread wear patterns.

19. A computer system comprising a computer processor coupled to a computer-readable memory unit, said memory unit comprising instructions that when executed by the computer processor implements a method comprising:
receiving, receiving, by said computer processor from a first plurality of sensors in a vehicle, first tread depth data associated with first tread depths at multiple points on a first tire tread comprised by a first tire on said vehicle;
first analyzing, by said computer processor, said first tread depth data;
determining, by said computer processor based on results of said first analyzing, uneven tread wear patterns at said multiple points of said first tire tread;
receiving, by said computer processor from a second plurality of sensors in said vehicle, sidewall data associated with sidewall portions of sidewalls on said first tire;
second analyzing, by said computer processor, said sidewall data; and
determining, by said computer processor based on results of said first analyzing, said second analyzing, and said uneven tread wear patterns, a first tire pressure value for a first internal portion of said first tire, wherein said first tire pressure value comprises a temporary tire pressure value associated with modifying a first group of tread depths of said first tread depths during operation of said vehicle, and wherein said modifying said first group of tread depths corrects said uneven tread wear patterns.

* * * * *